(12) United States Patent
Mavroeidis et al.

(10) Patent No.: US 11,301,995 B2
(45) Date of Patent: Apr. 12, 2022

(54) FEATURE IDENTIFICATION IN MEDICAL IMAGING

(71) Applicant: KONINKLIJKE PHILIPS N.V., Eindhoven (NL)

(72) Inventors: Dimitrios Mavroeidis, Eindhoven (NL); Bart Jacob Bakker, Eindhoven (NL); Stojan Trajanovski, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 134 days.

(21) Appl. No.: 16/696,926

(22) Filed: Nov. 26, 2019

(65) Prior Publication Data

US 2020/0175677 A1 Jun. 4, 2020

(30) Foreign Application Priority Data

Nov. 29, 2018 (EP) .................................... 18209197

(51) Int. Cl.
*G06K 9/00* (2006.01)
*G06T 7/00* (2017.01)
*G06K 9/62* (2022.01)

(52) U.S. Cl.
CPC ............ *G06T 7/0012* (2013.01); *G06K 9/628* (2013.01); *G06K 9/6278* (2013.01); *G06K 2209/05* (2013.01); *G06T 2207/20081* (2013.01)

(58) Field of Classification Search
CPC ......... G06T 7/0012; G06T 2207/20081; G06T 2207/20084; G06T 2207/10081; G06T 2207/30096; G06K 9/6278; G06K 9/628; G06K 2209/05; G06K 2209/053; G06K 9/6292; G06K 9/6274; G16H 30/20
See application file for complete search history.

(56) References Cited

U.S. PATENT DOCUMENTS

| | | | |
|---|---|---|---|
| 2018/0089505 A1* | 3/2018 | El-Khamy | ................ G06T 7/11 |
| 2018/0225823 A1 | 8/2018 | Zhou et al. | |
| 2018/0260957 A1 | 9/2018 | Yang et al. | |

(Continued)

OTHER PUBLICATIONS

Yang, Dong, et al. "Automatic liver segmentation using an adversarial image-to-image network." International Conference on Medical Image Computing and Computer-Assisted Intervention. Springer, Cham, 2017. https://link.springer.com/chapter/10.1007/978-3-319-66179-7_58 (Year: 2017).*

(Continued)

*Primary Examiner* — Sean M Conner
*Assistant Examiner* — Han Hoang

(57) ABSTRACT

Presented are concepts for feature identification in medical imaging of a subject. One such concept processes a medical image with a Bayesian deep learning network to determine a first image feature of interest and an associated uncertainty value, the first image feature being located in a first sub-region of the image. It also processes the medical image with a generative adversarial network to determine a second image feature of interest within the first sub-region of the image and an associated uncertainty value. Based on the first and second image features and their associated uncertainty values, the first sub-region of the image is classified.

20 Claims, 5 Drawing Sheets

(56) References Cited

U.S. PATENT DOCUMENTS

2020/0161005 A1* 5/2020 Lyman ................. G06T 11/206
2020/0193236 A1* 6/2020 Oosake ................ G06K 9/6273

OTHER PUBLICATIONS

Sedai, Suman, et al. "Joint segmentation and uncertainty visualization of retinal layers in optical coherence tomography images using Bayesian deep learning." Computational Pathology and Ophthalmic Medical Image Analysis. Springer, Cham, 2018. 219-227. (Year: 2018) https://link.springer.com/chapter/10.1007/978-3-030-00949-6_26 (Year: 2018).*

Kendall, A. et al., "What Uncertainties Do We Need in Bayesian Deep Learning for Computer Vision?", 2018.

Saatchi, Y. et al., "Bayesian GAN", 31st Conference on Neural Information Processing Systems (NIPS 2017), Long Beach, CA, USA.

Gordon, J. et al., "Bayesian Semi-supervised Learning with Deep Generative Models", Second workshop on Bayesian Deep Learning (NIPS 2017), Long Beach, CA, USA.

Ng, A., "Generative Learning algorithms", CS229 Lecture notes, Part IV, 2018.

Selvaraju, R. et al., "Grad-CAM: Visual Explanations from Deep Networks via Gradient-based Localization", Mar. 2017.

* cited by examiner

FEATURE IDENTIFICATION IN MEDICAL IMAGING

CROSS-REFERENCE TO PRIOR APPLICATIONS

This application claims the benefit of European Patent Application No. 18209197.5, filed on 29 Nov. 2018. This application is hereby incorporated by reference herein.

FIELD OF THE INVENTION

This invention relates generally to medical imaging of a subject, such as a person or patient, and more particularly to identifying features in a medical image of a subject.

BACKGROUND OF THE INVENTION

Recent technological advances have led to the use of models that are designed to assist in medical image analysis (e.g. for the purpose of identifying medical features and/or making clinical decisions).

In medical image analysis, it is preferable to be able to explain the reasoning behind a model's decision(s). This is especially important in the healthcare domain, where medical practitioners need to understand the analysis results and accept or adapt a model's decision accordingly.

In order to facilitate model verification, it is known to associate explanations to visual features that are overlaid on the medical image (i.e. visual overlays of the image) so that a medical practitioner can quickly and easily check or verify decisions with respect to features of the medical image. Conventional approaches to this simply create 'heat maps' (e.g. visual representations of where in a medical image a decision is related to) without providing any further information related to the different types of image features.

SUMMARY OF THE INVENTION

The invention aims to at least partly fulfil the aforementioned needs. To this end, the invention provides systems and methods as defined in the independent claims. The dependent claims provide advantageous embodiments.

There is provided a method for feature identification in medical imaging of a subject, the method comprising: processing a medical image with a Bayesian deep learning network to determine a first image feature of interest and an associated uncertainty value, the first image feature being located in a first sub-region of the image; processing the medical image with a generative adversarial network to determine a second image feature of interest within the first sub-region of the image and an associated uncertainty value; and based on the first and second image features and their associated uncertainty values, classifying the first sub-region of the image.

Proposed is a concept for identifying image features and associating a measure of uncertainty to such features. Such a concept may rely upon the use of Generative Adversarial Networks (GANs) and Bayesian Deep Learning (BDL). Proposed embodiments may, for example, be useful for identifying image features that are relevant to a model output at pixel level. Furthermore, embodiments may facilitate the provision of additional information related to the different types of image features and/or the uncertainty associated with image features.

Use of GANs and BDL enables different types of uncertainties to be captured, thus enabling improved understanding and/or classification accuracy. For instance, the BDL can capture uncertainty related to (insufficient) sample size, borderline cases, and aleatoric (i.e. random) uncertainty (i.e. uncertainty related to the noise inherent in the observations), whereas a GAN can capture out-of-sample uncertainties, i.e. parts of the image that differ substantially from the data generating distribution.

Accordingly, there may be provided a concept which goes beyond conventional approaches that simply highlight image regions relevant to a model output without providing any additional explanation about the image features that these regions correspond to. For instance, proposed embodiments may associate an uncertainty measure to the different image regions (i.e. sub-portions). This may enable visual features (such as image overlays and associated textual descriptions) to be provisioned, which may allow a medical expert (e.g. clinical expert, technician, medical practitioner, radiologist, etc.) to quickly assess the results of a model by focusing on image features that the model is less confident about.

Embodiments may be based on the use of a Generative Adversarial Network (GAN) and Bayesian Deep Learning (BDL) network that are trained using the case descriptions that are included in one or more medical reports relating to (or associated with) the medical image. The BDL network may be trained to capture a first type of uncertainty important for a medical practitioner, whereas the GAN may be trained to be able to capture a second, different type of uncertainty. Both the GAN and BDL may employ additional network outputs that account for model uncertainty (e.g. at pixel level). Such networks may be built using conventional machine learning and/or image processing techniques, thus leveraging historical data and/or established knowledge to improve the accuracy of determinations provided by proposed embodiments.

During deployment, an embodiment may be able to provide an estimation of uncertainty about an image feature or region (e.g. indicate a part of the image is important for computations but there is a high level of uncertainty associated with it). For instance, an uncertain region detected by the GAN, but ignored by the BDL, may be inferred to be an indication that a region of the image is out-of-spec but not used by the model. Similarly, an uncertain region detected by the BDL, but not by the GAN, may be inferred to be an indication that this is a difficult/borderline case to classify but similar examples were provided during training. An uncertain region detected by both GANs and BDL may be inferred to be an indication that a region of the image is out-of-spec and also influences the model output.

Accordingly, proposed embodiments may identify image regions that are important for a model output and also associate them with visual features (e.g. image overlays with associated textual descriptions) that are used by a medical practitioner. This may allow a medical practitioner to quickly and easily validate results of a model and identify cases where the model does not make the correct decisions. Further, embodiments may identify an uncertainty associated with each image region. This may allow the medical practitioner to review the model output starting from the parts that are most uncertain for example.

Improved (e.g. more accurate and/or easier) medical image analysis and medical imaging-based diagnosis of a subject may therefore be facilitated by proposed embodiments. Embodiments may also be employed to improve the efficiency and/or effectiveness of a Clinical Decision Support (CDS) system. Improved CDS concepts may thus be provided by proposed embodiments.

Proposed embodiments may therefore be of particular relevance to Computerised Tomography (CT) scanning, Positron Emission Tomography (PET)/CT scanning and/or MRI scanning and subject diagnosis since, for example, it may help to identify features in CT images, PET/CT images and/or MRI images and identify an uncertainty associated with each feature. Proposed concepts may also facilitate accurate assessment or diagnosis of the health of a subject using medical scanning (such as CT scanning, PET scanning or MRI scanning for example). Accordingly, an image feature may comprise a MRI feature of an MRI image (such as a nodule). Similarly, an image feature may comprise a CT image feature of a CT image.

In some proposed embodiments, classifying the first sub-region of the image may comprise: based on the uncertainty values associated with the first and second image features, determining if the first and second image features are uncertain; and classifying the first sub-region of the image based on which of the first and second image features are determined to be uncertain. For example, embodiments may classify the first sub-region as belonging to a first category if both of the first and second image features are determined to be uncertain. Also, embodiments may classify the first sub-region as belonging to a second category if only the first image feature is determined to be uncertain. Further, embodiments may classify the first sub-region as belonging to a third category if only the second image feature is determined to be uncertain. For instance, as mentioned above, an uncertain region detected by both GANs and BDL may be inferred to be an indication that a region of the image is out-of-spec and also influences the model output.

In some embodiments, determining if the first and second image features are uncertain may comprise: comparing the uncertainty values associated with the first and second image features with a threshold value. Simple comparison methods may therefore be employed to uncertain image features of a medical image. Straight-forward and reduced-complexity implementations that facilitate accurate and/or informed medical image may thus be realised.

Some embodiments may further comprise determining an uncertainty value for sub-region of the image based on the uncertainty values associated with the first and second image features. This may provide the advantage of improving an amount of information available for assessing image analysis results of a model.

The first and second image features may be the same image feature. In other words, the first and second image features may comprise the same image feature present in a sub-region of the image. Conversely, in some embodiments, the processing of the medical images may be such that the first image feature may differ (at least partly) from the second image feature. That is, processing a medical image with a BDL network may determine the first image feature such that it differs from a second image feature determined from processing a medical image with a GAN.

An embodiment may comprise the step of training the BDL network with a plurality of medical documents. Such training may, for example, employ descriptions of image features provided by one or more medical documents.

Also, an embodiment may comprise the step of training the GAN to generate image features based on features described by one or more medical documents. Training data and cross validation learning schemes may thus be employed to refine embodiments, thereby improving an accuracy and/or relevance of information provided by embodiments.

Embodiments may further comprise the step of generating an output signal based on the determined classification of the first sub-region of the image. Embodiments may be adapted to provide such an output signal to at least one of: the subject; a medical practitioner; medical imaging apparatus operator; and a radiographer. The output signal may thus be provided to a user or medical imaging apparatus for the purpose of indicating a sub-region of the image comprising an image features and its associated uncertainty.

Some embodiments may further comprise the step of generating a control signal for modifying a graphical element based on the classification of the first sub-region of the image. The graphical element may then be displayed in accordance with the control signal. In this way, a user (such as a radiologist) may have an appropriately arranged display system that can receive and display information about a medical image of a subject, and that user may be remotely located from the subject. Embodiments may therefore enable a user to remotely analyse a medical image of a subject (e.g. patient).

According to yet another aspect of the invention, there is provided computer program product for feature identification in medical imaging of a subject, wherein the computer program product comprises a computer-readable storage medium having computer-readable program code embodied therewith, the computer-readable program code configured to perform all of the steps of an embodiment when executed on at least one processor.

A computer system may be provided which comprises: a computer program product according to an embodiment; and one or more processors adapted to perform a method according to an embodiment by execution of the computer-readable program code of said computer program product.

In a further aspect, the invention relates to a computer-readable non-transitory storage medium comprising instructions which, when executed by a processing device, execute the steps of the method for feature identification in medical imaging of a subject according to an embodiment.

According to another aspect of the invention, there is provided a system for feature identification in medical imaging of a subject, the system comprising: a Bayesian deep learning network configured to process a medical image to determine a first image feature of interest and an associated uncertainty value, the first image feature being located in a first sub-region of the image; a generative adversarial network configured to process the medical image to determine a second image feature of interest within the first sub-region of the image and an associated uncertainty value; and a classification component configured to classify the first sub-region of the image, based on the first and second image features and their associated uncertainty values.

It will be appreciated that all or part of a proposed system may comprise one or more data processors. For example, the system may be implemented using a single processor which is adapted to undertake data processing in order to determine subject motion.

The system for feature identification in medical imaging of a subject may be remotely located from the medical imaging apparatus, and medical image data may be communicated to the system unit via a communication link.

The system may comprise: a server device comprising the BDL network and GAN; and a client device comprising the classification component. Dedicated data processing means may therefore be employed for the purpose of determining image features of interest, thus reducing processing requirements or capabilities of other components or devices of the system.

The system may further comprise a client device, wherein the client device comprises the BDL network, GAN, and a classification component. In other words, a user (such as a medical professional) may have an appropriately arranged client device (such as a laptop, tablet computer, mobile phone, PDA, etc.) which processes received medical image data (e.g. medical images) in order to classify one or more sub-regions of the image.

Thus, processing may be hosted at a different location from where the medical imaging happens. For example, for reasons of computing efficiency it might be advantageous to execute only part of the processing at the medical imaging location, thereby reducing associated costs, processing power, transmission requirements, etc.

Thus, it will be understood that processing capabilities may therefore be distributed throughout the system in different ways according to predetermined constraints and/or availability of processing resources.

Embodiments may also enable some of the processing load to be distributed throughout the system. For example, pre-processing may be undertaken at a medical imaging system. Alternatively, or additionally, processing could be undertaken at a communication gateway. In some embodiments, processing may be undertaken at a remote gateway or sever, thus relinquishing processing requirements from an end-user or output device. Such distribution of processing and/or hardware may allow for improved maintenance abilities (e.g. by centralizing complex or expensive hardware in a preferred location). It may also enable computational load and/or traffic to be designed or located within a networked system according to the processing capabilities available. A preferable approach may be to process medical image data locally and transmit extracted data for full processing at a remote server.

Embodiments may be implemented in conjunction with pre-existing, pre-installed or otherwise separately-provisioned medical imaging apparatus (such as a CT scanner, PET scanner or MRI scanner), and signals, data or images from such apparatus may be received and processed in accordance with proposed concepts. Other embodiments may be provided with (e.g. integrated into) medical imaging apparatus (such as CT scanning apparatus or an MRI scanner).

These and other aspects of the invention will be apparent from and elucidated with reference to the embodiment(s) described hereinafter.

BRIEF DESCRIPTION OF THE DRAWINGS

Examples in accordance with aspects of the invention will now be described in detail with reference to the accompanying drawings, in which.

DETAILED DESCRIPTION OF THE EMBODIMENTS

Figure 1:
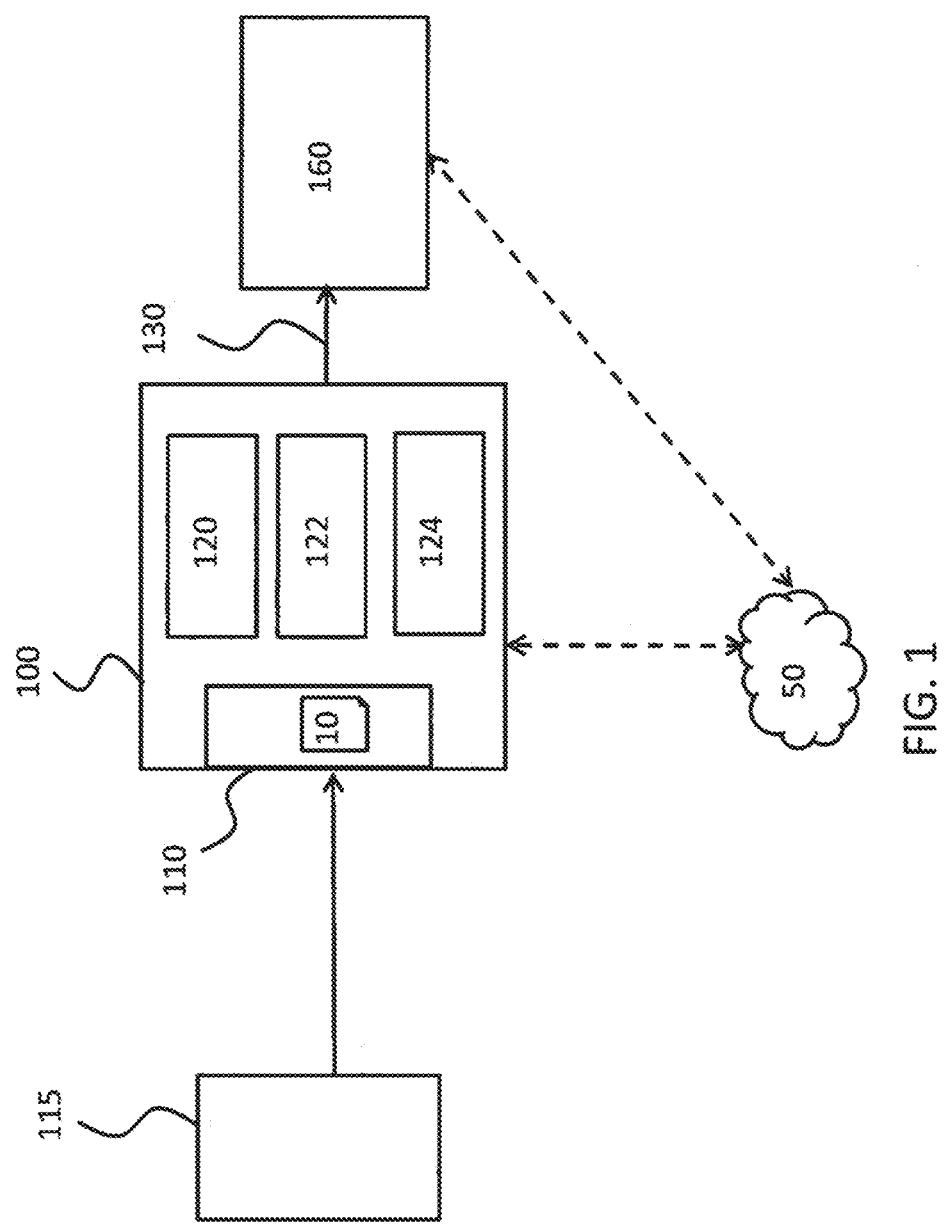
FIG. 1 is a simplified block diagram of a system for feature identification in medical imaging of a subject according to an embodiment.

Proposed is a concept for identifying image features in a medical image and associating a measure of uncertainty to such features. This may enable the provision of information that may be useful for assessing and/or improving a model output.

In particular, GANs and BDL networks can be employed. Combined use of GANs and BDL networks can capture different types of uncertainties. For instance, BDL can capture uncertainty related to (insufficient) sample size, borderline cases, as well as aleatoric uncertainty (e.g. uncertainty related to the noise inherent in observations), while GANs can capture out-of-sample uncertainties, i.e. parts of the image that differ substantially from the data generating distribution. Association of such uncertainty measures with image features may enable visual features (e.g. a graphic overlay with textual description of the associated uncertainty measure) to be associated with the image features. This may facilitate simple and quick assessment of model results (e.g. by identifying image features that the model is less confident about).

Employed GANs and BDL networks may be trained using descriptions included in medical reports relating to the medical image. For example, a BDL network may be trained to detect image features important for a medical practitioner, whereas a GAN may be trained to be able to generate examples related to each feature combination. Such networks may be built using conventional machine learning and/or image processing techniques, thus leveraging historical data and/or established knowledge to improve the accuracy of determinations provided by proposed embodiments.

Embodiments may provide an estimation of uncertainty about image features. Also, information may be inferred from which of the GANs and BDL networks identify an image feature as uncertain (because the GANs and BDL networks capture different types of uncertainties for example).

Embodiments may, for example, be useful for improving medical image analysis for subjects. Such subjects may, for instance, include a disabled person, an elderly person, an injured person, a medical patient, etc. Elderly persons can mean persons above 50 years, above 65 years, above 70, or above 80 years old, for example.

Illustrative embodiments may be utilized in many different types of medical imaging apparatus and/or medical imaging facilities, such as a hospital, ward, research facility, etc.

By way of example, image feature identification and assessment may be useful for understanding and/or evaluating decisions made by an image analysis model. Using a proposed embodiment, a user may, for example, identify image features that are most relevant to a model output.

Also, embodiments may be integrated in medical imaging systems to provide real-time information to technicians regarding detected image features while scanning is in progress. Using such information, a technician may check model outputs and/or decisions and, if necessary, adapt or modify the model while the subject is still on the scanner table. In this way, a subject need not re-visit the medical imaging facility for a repeat scan.

Proposed embodiments may identify uncertain decisions or outputs from image analysis models. Such decisions/output may then be focussed upon and/or improved (e.g. via learning from medial documents associated with the image and/or subject).

In order to provide a context for the description of elements and functionality of the illustrative embodiments, the Figures are provided hereafter as examples of how aspects of the illustrative embodiments may be implemented. It should therefore be appreciated that the Figures are only examples and are not intended to assert or imply any limitation with regard to the environments, systems or methods in which aspects or embodiments of the present invention may be implemented.

Embodiments of the present invention are directed toward enabling image features (e.g. nodules, textures, etc.) in a medical image (such as a medical scan) to be identified and potentially classified. This may be useful for assessing and improving medical image analysis models, e.g. by identifying uncertain decisions or output made by a medical image analysis model.

Embodiments may employ conventional GANs and BDL networks to identify image features relevant to a model output. Based on training data (e.g. historical data previously-established results and/or previous observations from a medical records or documentation), an uncertainty measure may be associated with an image feature or sub-region, thus enabling a user to quickly assess model results/decisions (e.g. by focussing on the image feature(s)/region(s) that the model is less certain about). This may help to reduce a number of incorrect or inaccurate image analysis decisions and thus provide improved medical image analysis. Embodiments may therefore be useful for real-time medical scan assessment purposes, for example to assess if an image analysis model is suitable for a specific subject and/or medical scanning process.

Image features may be detected or classified from medical images produced by medical imaging devices and systems that already exist. Accordingly, the proposed concepts may be used in conjunction with existing medical imaging systems/methods (such as those employed for CT, PET/CT and/or MRI scanning for example). Because many such medical imaging methods/systems are known and any one or more of these may be employed, detailed description of such methods/systems is omitted from this description.

FIG. 1 shows an embodiment of a system 100 for feature identification in medical imaging of a subject according to an embodiment.

The system 100 comprises an interface component 110 adapted to obtain a medical image 10. Here, the interface component 110 is adapted to receive the medical image 10 from medical imaging apparatus 115 (such as a MRI device for example).

The medical image 10 is communicated to the interface component 110 via a wired or wireless connection. By way of example, the wireless connection may comprise a short-to-medium-range communication link. For the avoidance of doubt, short-to-medium-range communication link may be taken to mean a short-range or medium-range communication link having a range of up to around one hundred (100) meters. In short-range communication links designed for very short communication distances, signals typically travel from a few centimetres to several meters, whereas, in medium-range communication links designed for short to medium communication distances, signals typically travel up to one hundred (10)0 meters. Examples of short-range wireless communication links are ANT+, Bluetooth, Bluetooth low energy, IEEE 802.15.4, ISA100a, Infrared (IrDA), Near Field Communication (NFC), RFID, 6LoWPAN, UWB, Wireless HART, Wireless HD, Wireless USB, ZigBee. Examples of medium-range communication links include Wi-Fi, ISM Band, Z-Wave. Here, the output signals are not encrypted for communication via the wired or wireless connection in a secured manner. However, it will be appreciated that, in other embodiments, one or more encryption techniques and/or one or more secure communication links may be employed for the communication of signals/data in the system.

The system 100 also comprises a Bayesian Deep Learning (BDL) network 120 configured to process the medical image 10 to determine a first image feature of interest, wherein the first image feature is located in a first sub-region of the image. The BDL network 120 is also configured to determine an uncertainty value associated with the first image feature.

The BDL network 120 is different from standard Deep Learning networks in the sense that the parameters of the network are not fixed and follow certain probability distributions (such as Gaussian, Bernoulli, etc.). This means that, during the model training process, the algorithms do not simply learn the optimal fixed parameter values but rather the probability distribution (e.g. means and variance of a Gaussian distribution) of the network parameters. The differences between a BDL network 120 and standard Deep Learning network may therefore be summarized as follows:

During training:
Standard Deep Learning: Identify optimal network parameter values that optimize loss function;
Bayesian Deep Learning: Identify optimal network parameter distributions that optimize loss function.
During inference:
Standard Deep Learning: Use learnt network parameter values to compute output;
Bayesian Deep Learning: Sample from the learnt network parameter distributions and compute a distribution for the network outputs Because with BDL one can generate a distribution of the network outputs, the variance of the outputs can be used to estimate model uncertainty, with higher variance being associated with higher uncertainty.

The system 100 further comprises a Generative Adversarial Network (GAN) 122 that is adapted to process the medical image to determine a second image feature of interest within the first sub-region of the image. The GAN 122 is also configured to determine an uncertainty value associated with the second image feature of interest.

The GAN has, in principle, two components: The first component is a generator that takes as input a random seed (i.e. a vector of Gaussian random variables) and produces an image that aims to be very similar to the input data generating distribution. The second component is the discriminator that takes as input both the output of the generator and examples of images from the input data and tries to classify them in two classes (real or fake). During a training process, the generator tries to "fool" the discriminator (i.e. make it classify fake images as real) and the discriminator tries to "beat" the generator by correctly identifying the fake images. Recent papers in the Machine Learning literature have been able to train very powerful generators using the GAN approach.

For this purpose, the GAN 122 of the system 100 may communicate with one or more data processing resources available in the internet or "cloud" 50. Such data processing resources may undertake part or all of the processing required to determine a second image feature of interest and/or as associated uncertainty value.

Information regarding the first and second image features of interest and their associated uncertainty values is provided to a classification component 124 of the system 110. The classification component 124 is adapted to classify the first sub-region of the image, based on the first and second image features and their associated uncertainty values.

More specifically, in this exemplary embodiment, the classification component 124 is adapted to determine if the first and second image features are uncertain based on the uncertainty values associated with the first and second image features. The classification component 124 then classifies the first sub-region of the image 10 based on which of the first and second image features are determined to be uncertain.

Again, for this purpose, the motion classification component 124 may communicate with one or more data processing resources available in the internet or "cloud" 50. Such data processing resources may undertake part or all of the processing required to determine a classification.

Thus, it will be appreciated that the embodiment may employ distributed processing principles.

The data processing system 110 is further adapted to generate an output signal 130 representative of a determined classification of the first sub-region of the image 10. In other words, after classifying the first sub-region of the image 10 (either with or without communicating with data processing resources via the internet or "cloud"), an output signal 130 representative of or determined classification is generated.

The system further comprises a graphical user interface (GUI) 160 for providing information to one or more users. The output signal 130 is provided to the GUI 160 via wired or wireless connection. By way of example, the wireless connection may comprise a short-to-medium-range communication link. As indicated in FIG. 1, the output signal 130 is provided to the GUI 160 from the data processing unit 110. However, where the system, has made use of data processing resources via the internet or cloud 50), an output signal may be made available to the GUI 160 via the internet or cloud 50.

Based on the output signal 130, the GUI 160 is adapted to communicate information by displaying one or more graphical elements in a display area of the GUI 160. In this way, the system may communicate information about a sub-region of the image 10 that may be useful for indicating if the sub-region comprises image features and a level of certainty associated with the sub-region. For example, the GUI 160 may be used to display graphical elements to a medical practitioner, a radiologist, a MRI apparatus operator, MRI technician or the like. Alternatively, or in addition, the GUI 160 may be adapted to display graphical elements to the subject.

From the above description of the embodiments of FIG. 1, it will be understood that there is proposed a system for identifying a level of uncertainty associated with sub-regions of an MRI scan of the subject. Here, the scan is assumed to be of an imaged volume (e.g. 3D segment or part) of the subject and formed from a plurality of parallel MRI slice images that are offset from each other along a central axis of the volume (with each MRI slice image being in a plane perpendicular to the central axis).

Accordingly, based on the uncertainty value associated with an image sub-region, an MRI image feature having an associated level of uncertainty above a threshold value may be identified. In this way, MRI image features having associated certainty that is inadequate (e.g. does not meet an acceptable amount) may be identified. The location(s) of uncertain feature in a scanned image may therefore be identified, further helping to establish where additional image analysis may be required.

By way of further example, the threshold value may be determined (e.g. calculated) based on historical data relating to previously determined image features. In this way, a threshold value for distinguishing excessive uncertainty from acceptable uncertainty may be refined or improved for improved accuracy or usability.

Although the example embodiment of FIG. 1 detailed above is described in relation to MRI scanning, it will be appreciated that proposed concepts may be extended to other medical scanning modalities such as CT scanning, PET scanning and the like.

Also, from the above description, it will be understood that the GAN and BDL network may be trained for improved performance and/or accuracy over time.

By way of example, the BDL 120 can be trained as follows:

(i) Define a neural network that is composed by a sequence of connected layers, with the weights of these layers following probability distributions. This network has two outputs, one corresponding to the class label (e.g. spiculated/lobulated nodule in a Lung cancer screening use-case), and the other output being a matrix (in case of 2D image inputs), or a 3D cube (in case of 3D image inputs) that has the same size of the input images. This second output captures the relevance of the image pixels for the class label computation. The elements of this output also follow a probability distribution that is learnt during the training process.

(ii) During training, the network learns the probability distributions for the network parameters, which in turn infers the probability distribution for the elements of the output that optimizes the loss function. The loss function is based on the class labels (e.g. the nodule characteristics that are extracted from the radiologist reports in a Lung Cancer Screening).

(iii) During inference, the network samples from the learnt parameter distributions and produces the class prediction output (i.e. that a nodule is spiculated in the Lung Cancer Screening example) and also the pixel level relevance of the input image to the output. Since the example is sampling from a distribution, both class label output and pixel-level relevance values will have a distribution and the variance of these values can be used as an expression of uncertainty (with high variance in the output being interpreted as low confidence).

By way of further example, the GAN 122 can be trained as follows:

(i) The GAN may, for example, be conditioned on class labels. Both generator and discriminator networks can then be Bayesian (i.e. their parameters could be probability distributions). However, in another example, the GAN 122 can be conditioned on label uncertainty (i.e. the generator can take as input both a class label, as well as an uncertainty value and thus be trained to generate more borderline cases between two classes);

(ii) After the GAN is trained, a random seed conditioned on a class label can be used as well label uncertainty to generate realistically looking images (e.g. realistic-looking nodules in the Lung Cancer Screening embodiment).

When presented with an image to classify, the most similar image that can be produced by the trained GAN can be identified. One can then compute the pixel-wise difference between the input image and the most similar image that can be generated from the GAN. The parts of the image that have high pixel-wise difference and are not part of the BDL uncertain pixels (e.g. using a variance threshold) can then be characterized as being out-of-specification.

Figure 2:
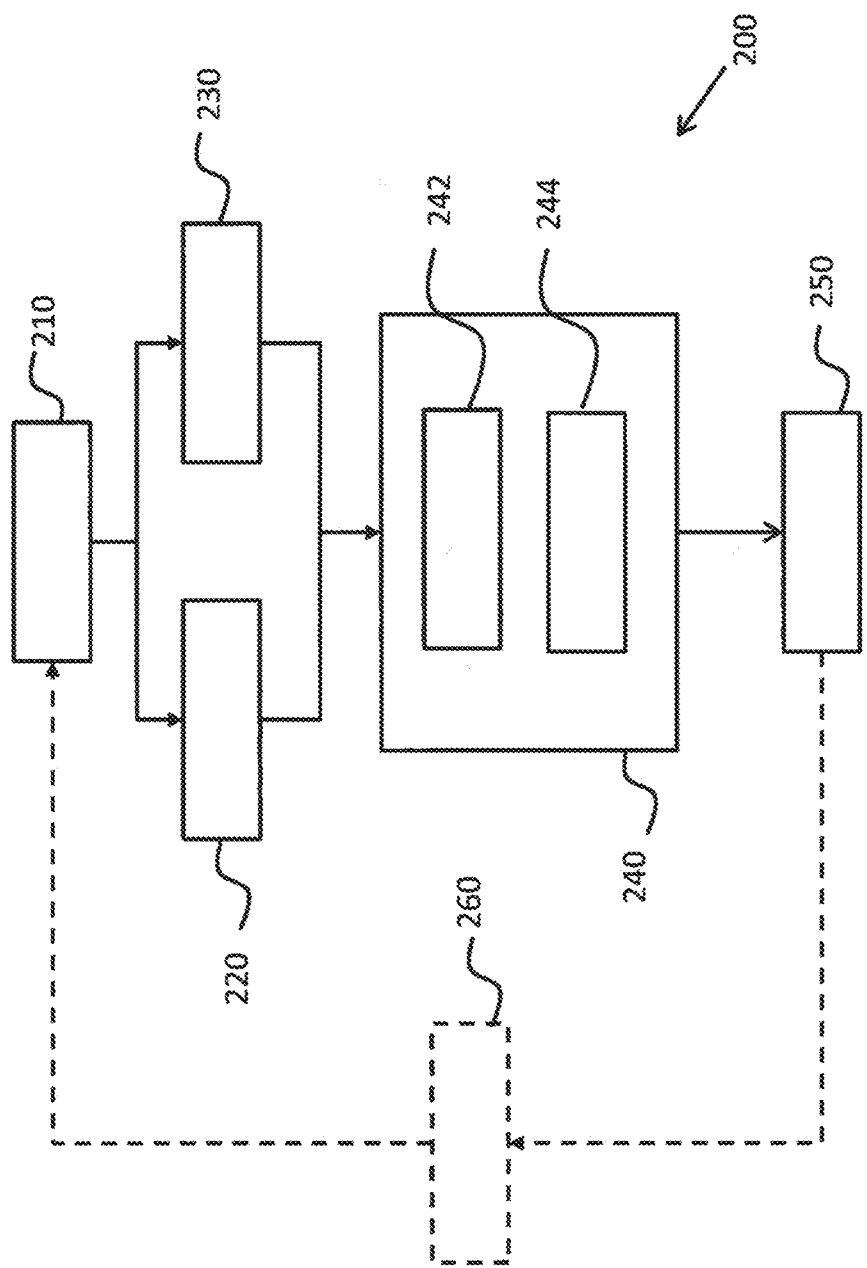
FIG. 2 is a flow diagram of a method for feature identification in medical imaging of a subject according to an embodiment.

Referring now to FIG. 2, there is depicted a flow diagram of a method 200 for feature identification in medical imaging of a subject. Such a technique may thus be used for identifying features in a medical image.

In FIG. 2, the step 210 comprises receiving a medical image of the subject. This may, for example, comprise receiving a medical image from a remotely-located imaging apparatus (such as a CT or MRI scanner for example). Thus, it will be appreciated the method may be performed using a medical image that has been produced by imaging apparatus that is either locally or remotely-located.

Step 220 comprises processing the medical image with a BDL network to determine a first image feature of interest (located in a first sub-region of the image) and an associated uncertainty value. Similarly, step 230 comprises processing the medical image with a GAN to determine a second image feature of interest within the first sub-region of the image and an associated uncertainty value. Step 220 and 230 may be performed separately, and may (in some embodiments) be performed in parallel. However, it will be understood that, in alternative embodiments, they may be performed sequentially, with step 220 being performed before step 230, or vice-versa). The basic principle, however, is that the image is processed with a BDL network and a GAN so as identify image features and associated uncertainty measures using two different approaches.

The results from steps 220 and 230 are provided to step 240, wherein the first sub-region of the image is classified based on the first and second image features and their associated uncertainty values. By way of example, the step 240 in this embodiment comprises the steps of: determining 242 if the first and second image features are uncertain based on the uncertainty values associated with the first and second image features; and classifying 244 the first sub-region of the image based on which of the first and second image features are determined to be uncertain.

For instance, the first sub-region may be classified as belonging to a first category if both of the first and second image features are determined to be uncertain. Conversely, the first sub-region may be classified as belonging to a second category if only the first image feature is determined to be uncertain, and the first sub-region may be classified as belonging to a third category if only the second image feature is determined to be uncertain. Here, determining if the first and second image features are uncertain comprises comparing the uncertainty values associated with the first and second image features with a threshold value.

The exemplary embodiment of FIG. 2 also includes the step 250 of determining an uncertainty value for sub-region of the image based on the uncertainty values associated with the first and second image features. In this way, a simple representation of the sub-region's uncertainty can be generated and associated with the sub-regions. This may enable a user to quickly and easily identify and assess the importance and/or relevance of the sub-region with respect to analysing an image analysis model's decision or output for the medical image.

Further, the embodiment of FIG. 2 may also include the additional step 260 of training the networks. For instance, step 260 of the exemplary embodiment of FIG. 2 includes training the BDL network with a plurality of medical documents and training the GAN to generate image features based on features described by one or more medical documents. Here, medical reports and/or patient medical records may be used, from which labels can be extracted and used to train the networks.

Figure 3:
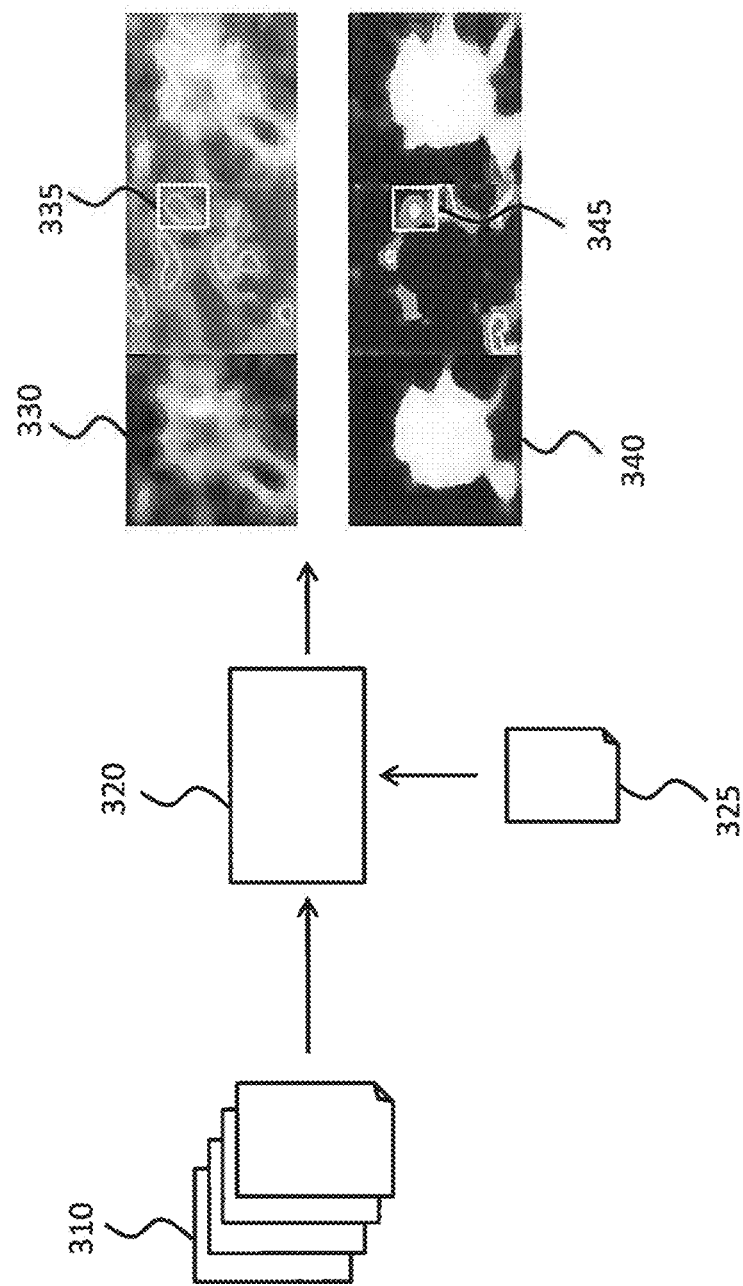
FIG. 3 depicts an embodiment in the context of Lung Cancer Screening using low-dose CT.

Referring now to FIG. 3, an embodiment is depicted in the context of Lung Cancer Screening using low-dose CT. In this context, model training is performed using image data (low-dose CT) along with the radiologists' reports 310 that contain information about the scan assessment and nodule characteristics.

Radiologists' reports 310 are provided to a system 320 according to a proposed embodiment. Nodule descriptions are extracted from the radiologist reports and used train a BDL network and GAN for the purpose of identifying and classify different nodule characteristics (i.e. speculation, part-solid, etc.) in a CT image 325 provided to the system 320. The BDL network and GAN of the system 320 are also adapted to determine a measure of uncertainty associated with the various identified features (e.g. highlighted and labelled regions).

By way of example, the system 320 identifies image features in a first version 330 of the CT image 325 that is for identification of part-solid nodules. Such image features having high uncertainty (as indicated by the box labelled 335) are highlighted and labelled (e.g. using visual features overlaid on the medical image) so that they are made easily identifiable to a viewer. Similarly, the system 320 identifies image features in a second version 340 of the CT image 325 that is for identification of speculated masses. Again, such image features having high uncertainty (as indicated by the box labelled 345) are highlighted and labelled so that they are made easily identifiable to a viewer.

The BDL approach captures the uncertainty that is related to borderline cases related to feature classification. However, to capture uncertainty related to data that was not part of our training sample (i.e. from different vendors or with lower image quality), the GAN is employed (and this may be optimized using the training data).

The trained GAN enables identification of regions of the CT image 325 that are less likely to be part of the training data. Accordingly, this provides a different measure of uncertainty that can be used in conjunction with the uncertainty provided by the BDL. For instance, it may provide information about the parts of the CT image 325 that contain structures (or noise) that were not part of the training data.

Accordingly, it will be appreciated that embodiments may be based on the combined use of a GAN and BDL network that are trained using descriptions provided by one or more medical reports relating to (or associated with) the medical image. The BDL network may be trained to detect a first type of image feature, whereas the GAN may be trained to be able to identify a second, different type of image feature. Such networks may be built using conventional machine learning and/or image processing techniques, thus leveraging historical data and/or established knowledge to improve the accuracy of determinations provided by proposed embodiments.

Figure 4:
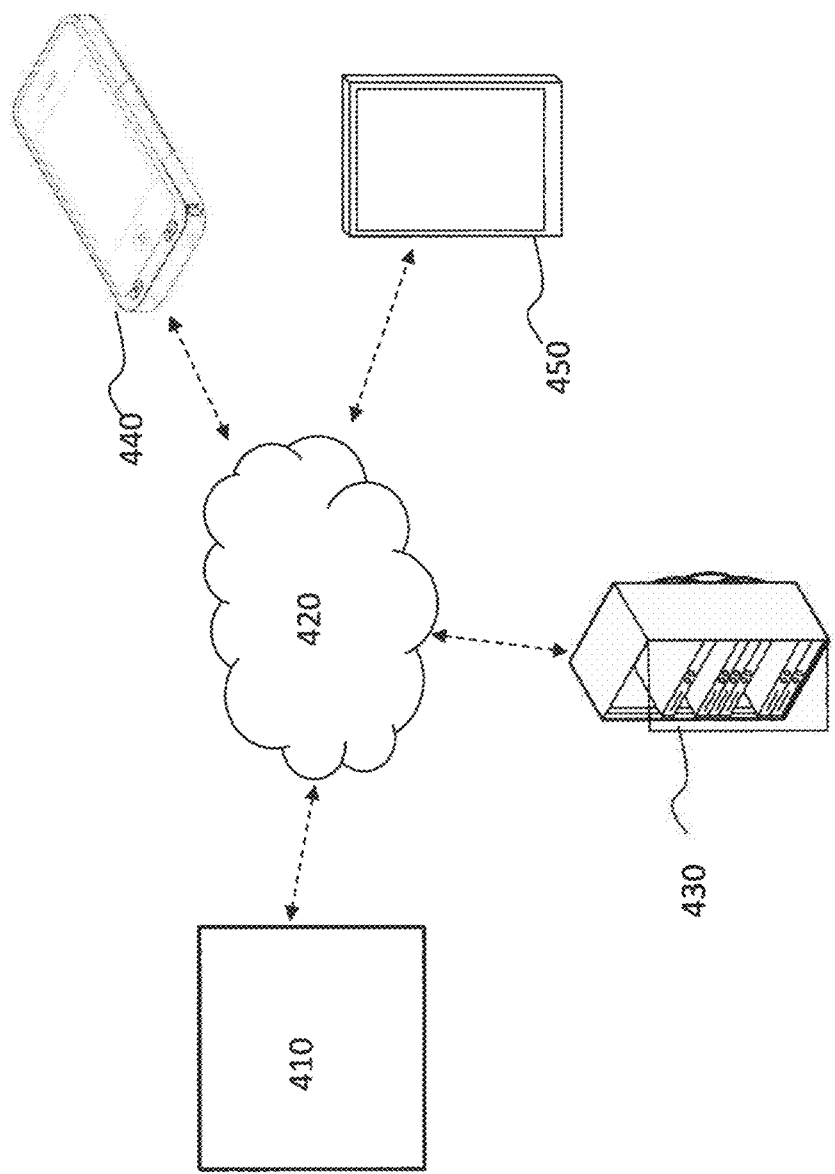
FIG. 4 is a simplified block diagram of a system for feature identification in medical imaging of a subject according to another embodiment.

Referring now to FIG. 4, there is depicted another embodiment of a system according to the invention comprising a CT scanning system 410 adapted to scan a volume of a subject and generate a plurality of CT image slices of the scanned volume. Here, the CT scanning system 410 comprises a conventional CT scanning system 410 that may, for example, be available for use in a CT scanning/imaging facility.

The CT scanning system 410 communicates output signals representative of acquired CT image slices via the internet 420 (using a wired or wireless connection for example) to a remotely-located data processing system 430 for feature identification in medical imaging of a subject (such as server).

The data processing system 430 is adapted to receive the one or more output signals from the CT scanning system 410 (e.g. as CT image slice data).

The data processing system 430 processes the CT scanning system output signals in accordance with a method according to a proposed embodiment to identify image features and their associated uncertainty values. More specifically, the method: processes a CT image slice with a BDL network to determine a first image feature of interest and an associated uncertainty value, the first image feature being located in a first sub-region of the image; and processes the CT image slice with a GAN to determine a second image feature of interest within the first sub-region of the image and an associated uncertainty value. Based on the first and second image features and their associated uncertainty values, the data processing system 430 classifies the first sub-region of the CT image slice.

The data processing system 430 is further adapted to generate output signals representative of the classification of the first sub-region of the CT image slice. Thus, the data processing system 430 provides a centrally accessible processing resource that can receive information from CT system and run one or more algorithms to identify and classify image features in a CT image of the subject. Information relating to the classification of an image sub-region can be stored by the data processing system (for example, in a database) and provided to other components of the system. Such provision of information about image sub-regions may be undertaken in response to a receiving a request (via the internet 420 for example) and/or may be undertaken without request (i.e. 'pushed').

For the purpose of receiving information about image sub-region classifications from the data processing system, and thus to enable the CT image to be analysed or assessed, the system further comprises first 340 and second 350 mobile computing devices.

Here, the first mobile computing device 340 is a mobile telephone device (such as a smartphone) with a display for displaying graphical elements representative of image sub-region classifications. The second mobile computing device 350 is a mobile computer such as a Laptop or Tablet computer with a display for displaying graphical elements representative of detected subject motion during a CT scan.

The data processing system 430 is adapted to communicate output signals to the first 440 and second 450 mobile computing devices via the internet 420 (using a wired or wireless connection for example). As mentioned above, this may be undertaken in response to receiving a request from the first 440 or second 450 mobile computing devices.

Based on the received output signals, the first 440 and second 450 mobile computing devices are adapted to display one or more graphical elements in a display area provided by their respective display. For this purpose, the first 440 and second 450 mobile computing devices each comprise a software application for processing, decrypting and/or interpreting received output signals in order to determine how to display graphical elements. Thus, the first 440 and second 450 mobile computing devices each comprise a processing arrangement adapted to one or more values representative of image sub-region classifications, and to generate a display control signal for modifying at least one of the size, shape, position, orientation, pulsation or colour of the graphical element based on the image sub-region classifications.

The system can therefore communicate information about features in a CT scan to users of the first 440 and second 450 mobile computing devices. For example, each of the first 440 and second 450 mobile computing devices may be used to display graphical elements to a medical practitioner, a radiologist or the subject.

Implementations of the system of FIG. 4 may vary between: (i) a situation where the data processing system 430 communicates display-ready data, which may for example comprise display data including graphical elements (e.g. in JPEG or other image formats) that are simply displayed to a user of a mobile computing device using conventional image or webpage display (which can be web based browser etc.); to (ii) a situation where the data processing system 430 communicates raw data set information that the receiving mobile computing device then processes the information to identify image features, determine associated uncertainty values, and then displays graphical elements based on the classification of image sub-regions (for example, using local software running on the mobile computing device). Of course, in other implementations, the processing may be shared between the data processing system 430 and a receiving mobile computing device such that part of the data generated at data processing system 430 is sent to the mobile computing device for further processing by local dedicated software of the mobile computing device. Embodiments may therefore employ server-side processing, client-side processing, or any combination thereof.

Further, where the data processing system 430 does not 'push' information (e.g. output signals), but rather communicates information in response to receiving a request, the user of a device making such a request may be required to confirm or authenticate their identity and/or security credentials in order for the information to be communicated.

Figure 5:
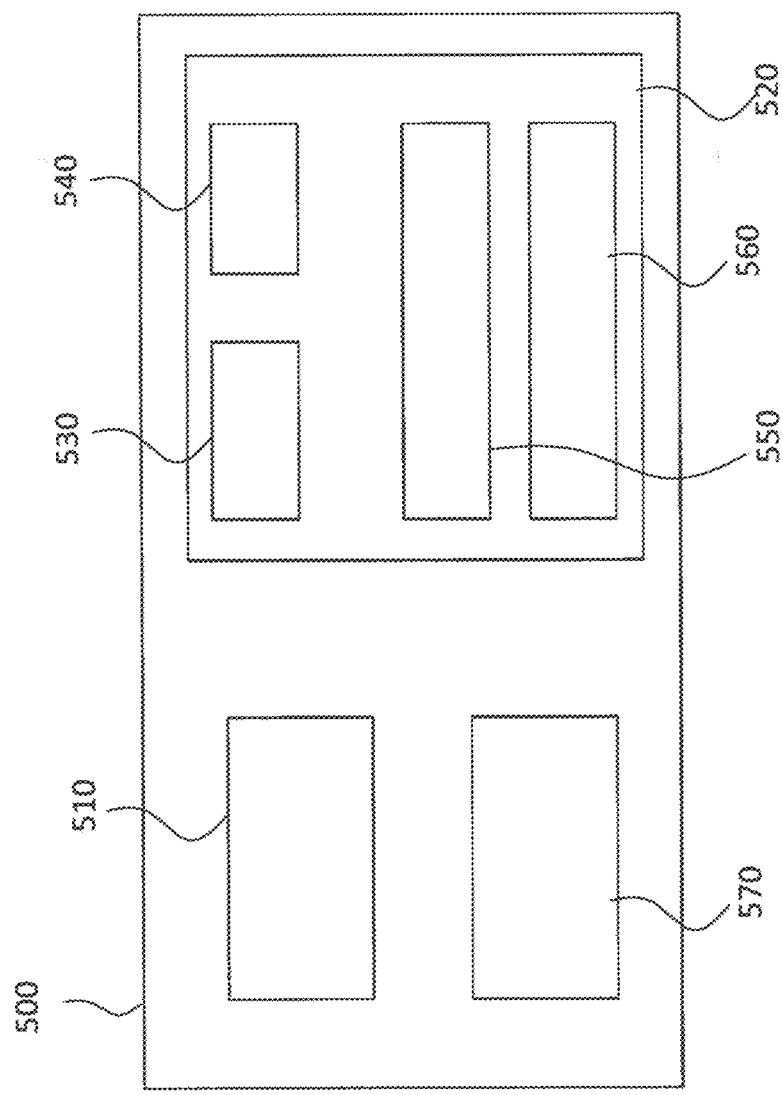
FIG. 5 is a simplified block diagram of a computer within which one or more parts of an embodiment may be employed.

FIG. 5 illustrates an example of a computer 500 within which one or more parts of an embodiment may be employed. Various operations discussed above may utilize the capabilities of the computer 500. For example, one or more parts of a system classifying image sub-regions may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a microprocessor.

The memory 520 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C #, Pascal, BASIC, API calls, HTML, XHTML, XML, php. Python, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, optimized for embedded implementation, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it will be appreciated that embodiments may therefore be useful for identifying and classifying features in a medical image of a subject. Accordingly, proposed embodiments may be applicable to a wide range of medical imaging concepts/fields. For instance, embodiments may be useful for lung cancer screening and calcium scoring, where medical images of a subject are used to investigate and/or assess the subject. For such cases, pixel-level information about the uncertainty can be provided, which may explain or supplement a model output for a medical professional (e.g. radiologist).

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand that various embodiments with various modifications are contemplated.

The invention claimed is:

1. A method for feature identification in medical imaging of a subject, the method comprising:

processing a medical image with a Bayesian deep learning network to determine a first image feature of interest and a first associated uncertainty value, the first image feature being located in a first sub-region of the medical image;

processing the medical image with a generative adversarial network to determine a second image feature of interest and a second associated uncertainty value, the second image feature being located in the first sub-region, wherein the first and second associated uncertainty values provide different measures of uncertainty; and classifying the first sub-region of the medical image based on the first and second associated uncertainty values from the Bayesian deep learning network and the generative adversarial network, respectively, wherein the classifying comprises (i) comparing the first associated uncertainty value and the second associated uncertainty value to a threshold value; and (ii) assigning a category of a plurality of categories for the first sub-region based on the comparisons, the plurality of categories comprising a first category indicating that the first and second associated uncertainty values exceed the threshold value, a second category indicating that the first associated uncertainty value but not the second associated uncertainty value exceeds the threshold value, a third category indicating that the second associated uncertainty value but not the first associated uncertainty value exceeds the threshold value.

2. The method of claim 1, wherein classifying comprises:
based on the first and second associated uncertainty values associated with the first and second image features, determining if the first and second image features are uncertain; and
classifying the first sub-region of the image based on which of the first and second image features are determined to be uncertain.

3. The method of claim 2, wherein the classifying comprises:
classifying the first sub-region as belonging to the first category if both of the first and second image features are determined to be uncertain.

4. The method of claim 3, wherein the classifying comprises:
classifying the first sub-region as belonging to the second category if only the first image feature is determined to be uncertain; and
classifying the first sub-region as belonging to the third category if only the second image feature is determined to be uncertain.

5. The method of claim 2, wherein determining if the first and second image features are uncertain comprises:
comparing the first and second associated uncertainty values associated with the first and second image features with the threshold value.

6. The method of claim 1, further comprising:
determining an uncertainty value for the first sub-region of the image based on the first and second associated uncertainty values associated with the first and second image features.

7. The method of claim 1, further comprising:
training the Bayesian deep learning network with a plurality of medical documents.

8. The method of claim 1, further comprising:
training the generative adversarial network to generate image features based on features described by one or more medical documents.

9. The method of claim 1, wherein the first uncertainty value associated with the first image feature of interest comprises a measure of uncertainty relating to at least one of: sample size and aleatoric uncertainty, and
wherein the second uncertainty value associated with the second image feature of interest comprises a measure of uncertainty relating to a data distribution of the medical image.

10. A computer program product for feature identification in medical imaging of a subject, wherein the computer program product comprises a computer-readable non-transitory storage medium having computer-readable program code embodied therewith, the computer-readable program code configured to perform all of the steps of claim 1 when executed on at least one processor.

11. A system comprising at least one processor and the computer program product of claim 10.

12. The method of claim 1, wherein the first image feature of interest is of a first type and the second image feature of interest is of a second type that is different than the first type.

13. A system for feature identification in medical imaging of a subject, the system comprising:
a Bayesian deep learning network configured to process a medical image to determine a first image feature of interest and a first associated uncertainty value, the first image feature being located in a first sub-region of the medical image;
a generative adversarial network configured to process the medical image to determine a second image feature of interest and a second associated uncertainty value, the second image feature being located in the first sub-region, wherein the first and second associated uncertainty values provide different measures of uncertainty; and
a processor comprising a classifier classification component configured to classify the first sub-region of the medical image based on the first associated uncertainty value from the Bayesian deep learning network and the second associated uncertainty value from the generative adversarial network, wherein the classifier is configured to (i) compare the first associated uncertainty value and the second associated uncertainty value to a threshold value; and (ii) assign a category of a plurality of categories for the first sub-region based on the comparisons, the plurality of categories comprising a first category indicating that the first and second associated uncertainty values exceed the threshold value, a second category indicating that the first associated uncertainty value but not the second associated uncertainty value exceed the threshold value, and a third category indicating that the second associated uncertainty value but not the first associated uncertainty value exceeds the threshold value.

14. The system of claim 13, wherein the classifier is adapted to:
based on the first and second associated uncertainty values associated with the first and second image features, determine if the first and second image features are uncertain; and
classify the first sub-region of the image based on which of the first and second image features are determined to be uncertain.

15. The system of claim 13,
wherein the processor is further configured to determine an uncertainty value for the first sub-region of the image based on the first and second associated uncertainty values associated with the first and second image features.

16. The system of claim 13, further comprising at least one of:
a first training component adapted to train the Bayesian deep learning network with a plurality of medical documents; and
a second training component adapted to train the generative adversarial network to generate image features based on features described by one or more medical documents.

17. The system of claim 13, wherein the processor is configured to determine if the first and second image features are uncertain based on the comparisons; and
the classifier is adapted to classify the first sub-region as belonging to the first category when the first associated uncertainty value and the second associated uncertainty value are determined to be uncertain.

18. The system of claim 17, wherein the classifier is adapted to classify the first sub-region as belonging to a second category when the first associated uncertainty value is determined to be uncertain and the second associated uncertainty value is not determined to be uncertain.

19. The system of claim 18, wherein the classifier is adapted to classify the first sub-region as belonging to a third category when the first associated uncertainty value is not determined to be uncertain and the second associated uncertainty value is determined to be uncertain.

20. The system of claim 13, wherein the first associated uncertainty value associated with the first image feature of interest comprises a first measure of uncertainty relating to at least one of: sample size and borderline cases related to feature classification.

* * * * *